United States Patent [19]

Gibson et al.

[11] Patent Number: 4,530,331

[45] Date of Patent: Jul. 23, 1985

[54] THRUST AND PLANETARY GEAR COUPLING FOR A ROTOR OF A DISTRIBUTOR FUEL INJECTION PUMP

[75] Inventors: Dennis H. Gibson, Edelstein; Alan R. Stockner, Chillicothe, both of Ill.

[73] Assignee: Caterpillar Tractor Co., Peoria, Ill.

[21] Appl. No.: 593,990

[22] Filed: Mar. 27, 1984

[51] Int. Cl.³ .......................................... F02M 41/06
[52] U.S. Cl. .................................................. 123/450
[58] Field of Search ............... 123/500, 450, 503, 502, 123/374, 449, 364, 372, 501; 417/270

[56] References Cited

U.S. PATENT DOCUMENTS

| | | | |
|---|---|---|---|
| 1,820,061 | 8/1931 | Flagg | 74/801 |
| 2,743,594 | 5/1956 | Hill et al. | 464/24 |
| 3,181,520 | 5/1965 | Mock | 123/478 |
| 3,381,615 | 5/1968 | Bailey | 123/502 |
| 3,830,597 | 8/1974 | Donahue | 417/462 |
| 3,856,438 | 12/1974 | Simko | 417/270 |
| 4,108,130 | 8/1978 | Bailey | 123/450 |
| 4,200,072 | 4/1980 | Bailey | 123/450 |

FOREIGN PATENT DOCUMENTS 3122703 12/1982 Fed. Rep. of Germany .
961674 6/1964 United Kingdom .

OTHER PUBLICATIONS

*Kinematics and Dynamics of Machines,* George H. Martin, Revised printing 1969, Excerpts: pp. 298-301.

*Primary Examiner*—Craig R. Feinberg
*Assistant Examiner*—David A. Okonsky
*Attorney, Agent, or Firm*—Anthony N. Woloch

[57] ABSTRACT

Planetary gear mechanisms are useful in distributor fuel injection pumps to couple a distributor rotor with a drive shaft in order to rotate the distributor rotor at a preselected output angular speed which is proportional to and less than a preselected input angular speed of the drive shaft.

Previously disclosed planetary gear coupling arrangements are typically rather bulky and merely provide an angular speed reduction function. In contrast, the subject thrust and planetary gear coupling provides a relatively more compact arrangement for angular speed reduction, and also includes a stationary dual-thrust plate which controls axial end play of both the drive shaft and the distributor rotor. The coupling further includes a relatively inexpensive and easy to assemble planet gear and carrier assembly which during operation rotatively drives the distributor rotor at the same output angular speed and which can also bear against the dual-thrust plate to act as a running thrust member.

6 Claims, 9 Drawing Figures

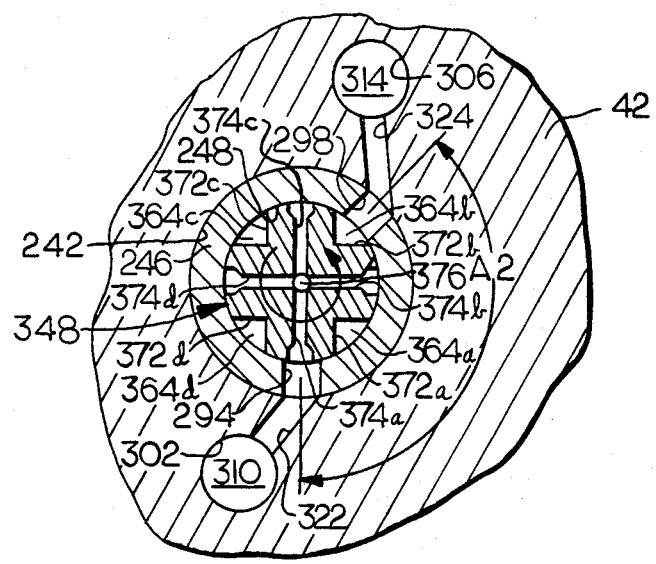
Fig_2_
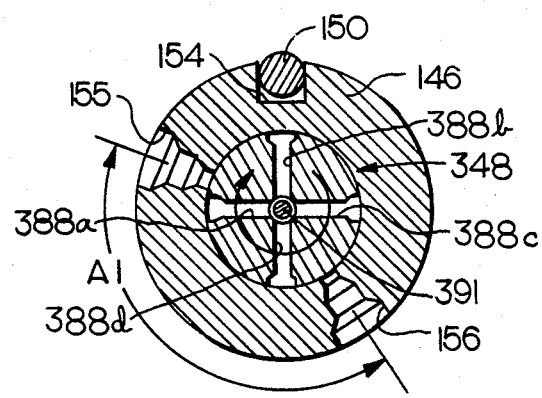
Fig_5_

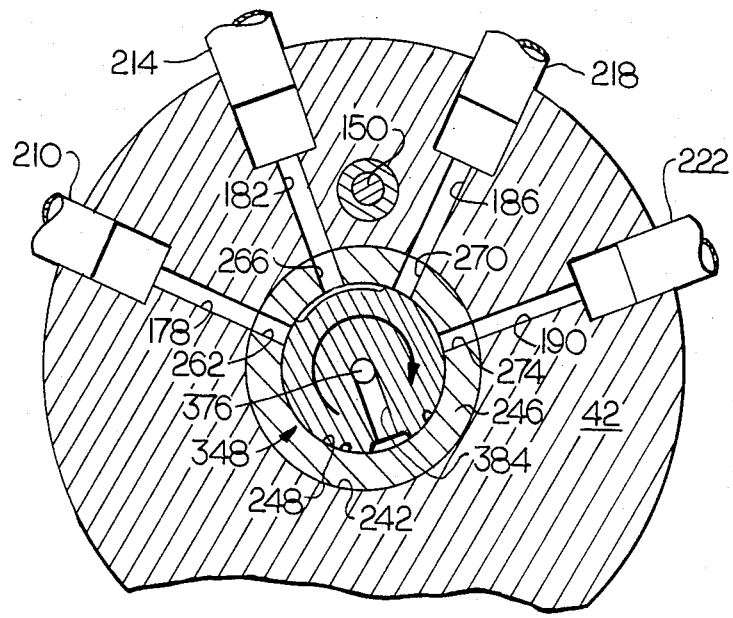
Fig_3_
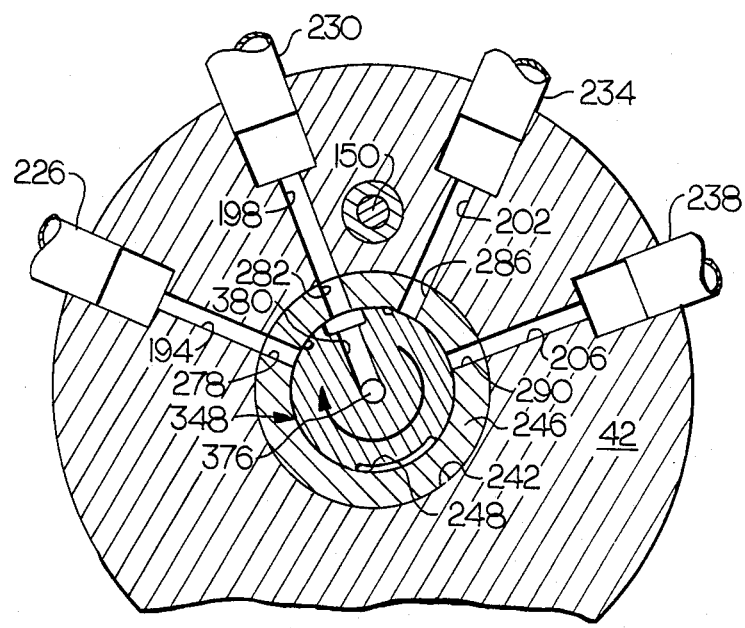
Fig_4_

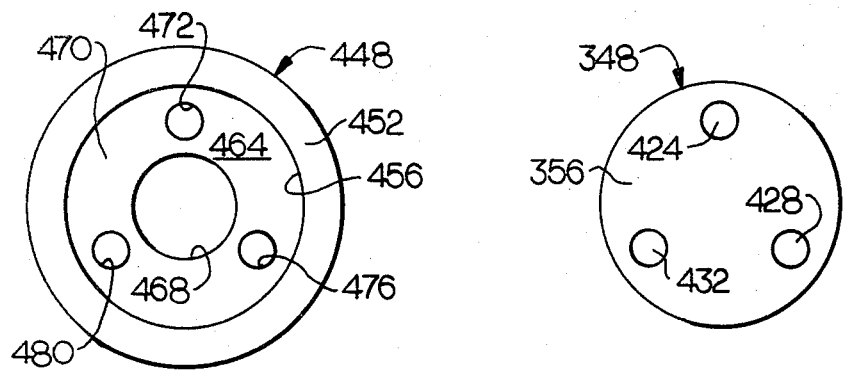
Fig. 7.  Fig. 8.
Fig. 9.
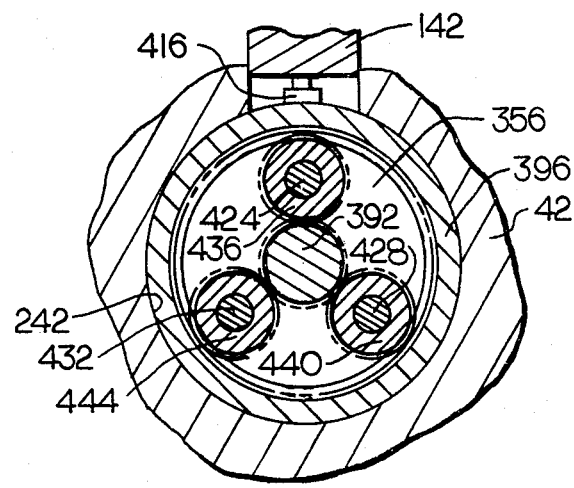

THRUST AND PLANETARY GEAR COUPLING FOR A ROTOR OF A DISTRIBUTOR FUEL INJECTION PUMP

DESCRIPTION

1. Technical Field

This invention relates generally to a distributor fuel injection pump and, more particularly, to an angular speed reduction coupling between a fuel injection pump drive shaft and a distributor rotor.

2. Background Art

A distributor fuel injection pump is herein generally defined as a high-pressure metering pump having a distributor rotor which sequentially communicates fuel, pressurized by a pumping element of that pump, to more than one combustion cylinder of an internal combustion engine.

In prior art distributor fuel injection pumps, such as disclosed in U.S. Pat. No. 3,830,597 issued to Donahue on Aug. 20, 1974, it has been conventional for the pump drive shaft to directly engage and drive the distributor rotor at the same angular speed. For example, for use in a four-cycle internal combustion engine, the typical fuel injection pump drive shaft and distributor rotor rotate together at one-half engine crankshaft speed.

As disclosed in U.S. Pat. No. 4,200,072, issued to Bailey on Apr. 29, 1980, it is advantageous to control the timing of fuel injection and to increase the fuel delivering capacity of a distributor fuel injection pump by providing an epicyclic gear train between a special pump drive shaft and the distributor rotor. Such an arrangement permits the drive shaft to be rotated at twice engine crankshaft speed while the distributor rotor is still rotated at one-half engine crankshaft speed. The pump drive shafts disclosed in U.S. Pat. No. 4,200,072 each have a cylindrical extension which in its outer extremity defines an eccentric inner bore which radially inwardly actuates relatively higher capacity pump plungers. The distributor rotors disclosed in U.S. Pat. No. 4,200,072 are moved axially in order to vary the quantity of fuel injection.

Nevertheless, the epicyclic gear arrangements disclosed in U.S. Pat. No. 4,200,072 are relatively bulky. Moreover, compared to distributor rotors that do not require axial movement during operation, distributor rotors that must move axially to control fuel quantity consequently require more space which makes the pump undesirably larger. Furthermore, distributor rotors which must both move axially and rotate at high angular speeds are more difficult to hydrodynamically balance which is a necessity in order to avoid serious problems such as seizure of the distributor rotor within the pump housing.

In summary, the above arrangements are not well suited for compactly and inexpensively controlling the axial end play or running clearances of both the drive shaft and the distributor rotor in a fuel injection pump where the distributor rotor is intended during operation to be axially fixed and is intended to rotate at an angular speed which is less than that of the pump drive shaft.

The present invention is directed to overcoming one or more of the problems as set forth above.

DISCLOSURE OF THE INVENTION

In one aspect of the present invention a thrust and planetary gear coupling for a distributor fuel injection pump is disclosed having a distributor rotor adapted during operation to be axially fixed and rotatably disposed in a rotor housing, a planetary gear mechanism for rotatively driving the distributor rotor with a drive shaft wherein the planetary gear mechanism includes a planet gear and carrier assembly which rotatively drives the distributor rotor, and a stationary dual-thrust plate adapted to be releasably fastened to a housing of the distributor fuel injection pump.

The dual thrust plate has a pair of oppositely facing thrust-bearing surfaces wherein one of the thrust-bearing surfaces is adapted to directly face and control the axial end play of the drive shaft. Moreover, during operation the other of the thrust-bearing surfaces is beared against by a proximate end portion of the planet gear and carrier assembly and thereby controls the axial end play of the distributor rotor.

The present invention provides an improved angular speed reduction coupling for a rotor of a distributor fuel injection pump. This unique configuration helps make the distributor fuel injection pump relatively more compact and simpler to manufacture and assemble. Furthermore, this configuration provides a single dual-thrust bearing component which inexpensively and accurately controls the axial end play of both the drive shaft and the distributor rotor which during operation rotate at different angular speeds.

BRIEF DESCRIPTION OF THE DRAWINGS

FIG. 2 is a diagrammatic enlarged cross-sectional partial view taken along line II—II of FIG. 1.

FIG. 3 is a diagrammatic enlarged cross-sectional partial view taken along line III—III of FIG. 1.

FIG. 4 is a diagrammatic enlarged cross-sectional partial view taken along line IV—IV of FIG. 1.

FIG. 5 is a diagrammatic enlarged cross-sectional partial view taken along line V—V of FIG. 1.

FIG. 7 is an end view taken along line VII—VII of FIG. 6.

FIG. 8 is an end view taken along line VIII—VIII of FIG. 6.

FIG. 9 is a diagrammatic enlarged cross-sectional view taken along line IX—IX of FIG. 1.

BEST MODE FOR CARRYING OUT THE INVENTION

Figure 1:
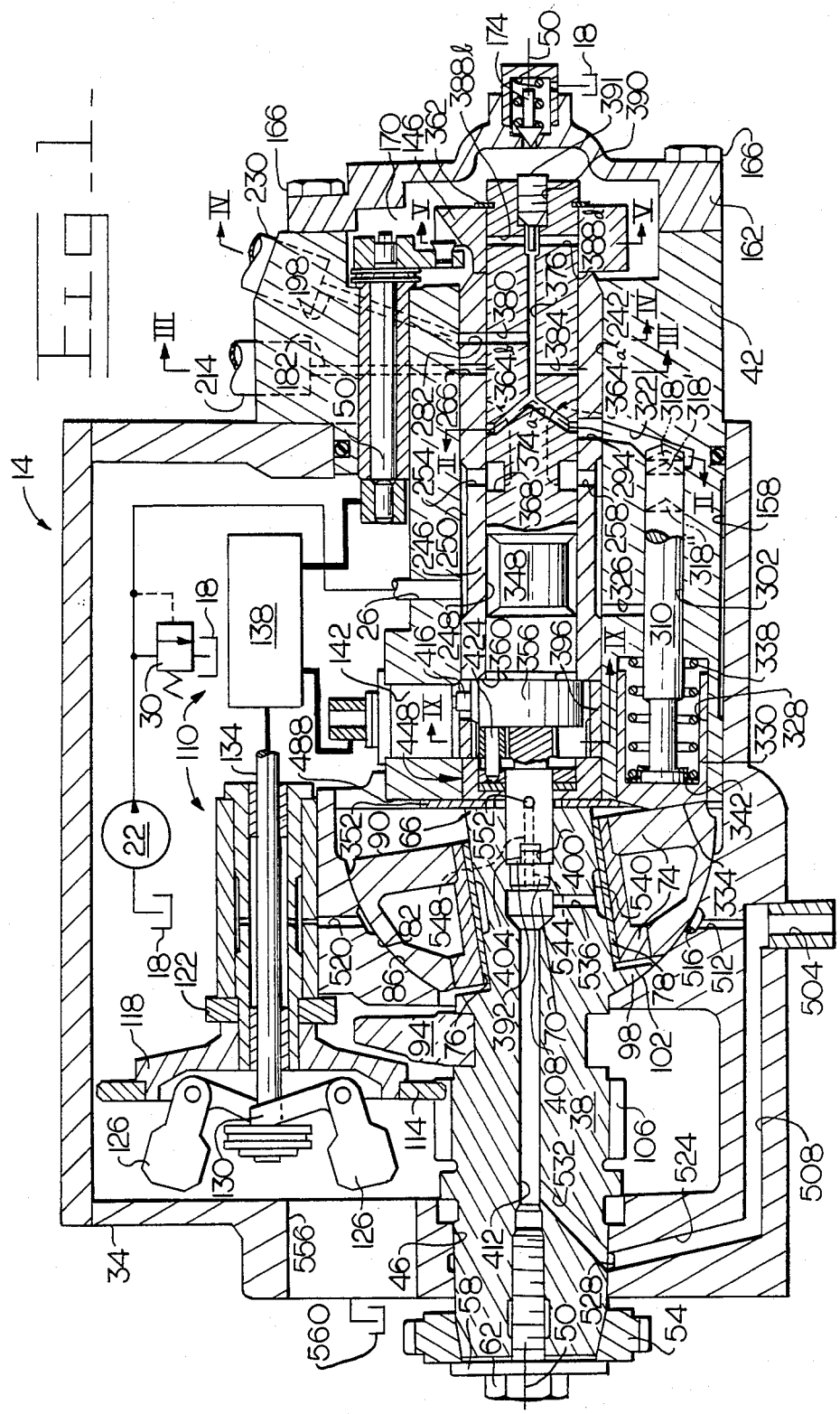
FIG. 1 is a diagrammatic cross-sectional view of an embodiment of the present invention as incorporated in a distributor fuel injection pump.

Referring to FIGS. 1-9 wherein similar reference numerals designate the same elements or features in the nine views, the preferred embodiment of a thrust and planetary gear coupling 10 (FIG. 6) is shown as incorporated in a distributor fuel injection pump 14.

While the embodiment of the distributor fuel injection pump 14 to be described in detail is adapted for use, for example, on a four-cycle even firing eight cylinder direct injection internal combustion engine (not shown), variations required to adapt the basic design to a two, three, four, five, six, or twelve combustion cylinder engine will also be discussed.

In FIG. 1, a fuel supply tank 18 located external of the distributor fuel injection pump is fluidly connected in series to a relatively low-pressure fuel transfer pump 22 and a fuel supply passage 26 both of which are located within the distributor fuel injection pump. The fuel transfer pump may be, for example, a positive displacement piston type pump. A pressure-relief valve means 30 is provided as schematically shown between the fuel transfer pump 22 and the fuel supply passage 26.

The distributor fuel injection pump further includes a drive shaft housing 34, a drive shaft 38, and a rotor housing 42. The drive shaft is journalled in a cylindrical bore 46 of the drive shaft housing and is rotatable about a primary longitudinal axis 50. An outer driven gear 54 is releasably connected around a tapered axial end portion of the drive shaft by a washer 58 and a bolt 62. The outer driven gear 54 is adapted to radially mesh with and be driven by a camshaft gear (not shown) or some other gear which is rotatively driven in timed relation to the crankshaft of the engine. The gear tooth ratio between the camshaft gear and the driven gear 54 is 4:1 so that during engine operation the driven gear 54 and drive shaft 38 rotate together at a same input angular speed of twice engine crankshaft speed. An oblique journal 66 is integrally formed on the opposite axial end portion of the drive shaft and has a crank axis 70 which is bent at a preselected angle, for example about 9°, relative to the primary longitudinal axis 50.

A partially hollow semi-spherical nutator member 74 having a central cylindrical hole 76 is freely rotatively journalled around the oblique journal by a sleeve bearing 78 which is positioned in the hole 76 and is fixed to or integral with the nutator member. The nutator member also includes a smooth convex outer surface 82 which is adapted to slidably bear against or be supported by a complementary substantially smooth concave internal surface 86 centrally located within the drive shaft housing 34. The convex and concave surfaces 82,86 are preferably semi-spherical. The nutator member 74 also includes an annular planar actuating surface 90 which extends along the equator of the nutator member and is therefore oriented perpendicular to the crank axis 70.

The combined or net center of gravity of the oblique journal 66, nutator member 74, and sleeve bearing 78 is located within the oblique journal at a point radially offset from the primary longitudinal axis 50 of rotation. This offset center of gravity and the high speed at which the drive shaft rotates therefore create an unbalanced rotating force of high magnitude. Furthermore, the high speed nutating motion of the nutator member 74 creates an unbalanced couple of high magnitude. A single radially outwardly extending counterweight 94 having a mass equal to the combined masses of the oblique journal, the nutator member, and the sleeve bearing is suitably positioned and fixed on a middle portion of the drive shaft 38 longitudinally away from the oblique journal 66 to balance out both the aforementioned rotating force and the rotating couple.

The middle portion of the drive shaft adjacent to the oblique journal 66 also includes a generally radially extending arcuate projection 98 integrally formed thereon which is spaced from the nutator member 74. The arcuate projection has a convex or semi-spherical outer surface 102 which is adapted to slidably bear against or be supported by the complementary concave internal surface 86 of the drive shaft housing 34. The arcuate projection 98 thus acts as a thrust member to control one direction of axial end play (i.e. leftward linear movement according to FIG. 1) of the drive shaft.

The middle portion of the drive shaft further includes a drive gear 106 integrally formed thereon which mechanically provides an angular speed signal proportional to engine crankshaft speed to a mechanical governor, generally indicated by the numeral 110. The governor 110 is mounted within the distributor fuel injection pump 14 substantially above the drive shaft 38. The drive gear 106 radially meshes with a driven gear 114 which is connected to a flyweight carrier 118 that is rotatively mounted within the drive shaft housing 34. The gear tooth ratio between the drive gear 106 and the driven gear 114 is, for example, 1:2 so that during engine operation the driven gear 114 and the flyweight carrier 118 rotate together at engine crankshaft speed. A cam 122 is rigidly fixed to the flyweight carrier and actuates a radially reciprocal pump piston (not shown) of the fuel transfer pump 22. Other gear tooth ratios between the drive gear 106 and the driven gear 114 may be utilized which rotate the flyweight carrier at other preselected angular speeds that are compatible for generating a preselected centrifugal flyweight force and for operating the fuel transfer pump. A plurality of generally L-shaped centrifugal governor flyweights 126 are pivotally connected to an end portion of the flyweight carrier. A toe 130 of each governor flyweight contacts and linearly actuates an axially slidable governor riser shaft 134 which is spring biased (rightwardly according to FIG. 1) against the toes 130.

The governor 110 controls the timing and quantity of fuel injection in preselected response to sensed changes in engine crankshaft speed. More specifically, the governor riser shaft 134 is operatively connected by way of a system of mechanical linkages 138 to a rotatable cylindrical timing advance crank 142 shown in FIGS. 1 and 9.

The governor riser shaft is also operatively connected to a rotatable fuel metering collar 146, shown in FIGS. 1 and 5, by way of the system of mechanical linkages 138 and an axially rotatable fuel metering crank 150. An arm of the metering crank 150 engages a peripheral rectangular slot 154 defined in the top of the fuel metering collar 146. The fuel metering collar 146 is concentrically aligned with the primary longitudinal axis 50 and defines a pair of outwardly divergent fuel spill ports 155,156 which radially outwardly extend through the collar. The fuel spill ports 155,156 are angularly spaced from each other a preselected angle A1 equal to 135° relative to the primary longitudinal axis.

As shown in FIG. 1, the relatively thick-walled rotor housing 42 contains the high fuel pressure working components of the distributor fuel injection pump 14 and is slidably guided or plugged into a complementary longitudinal cavity 158 of the drive shaft housing 34. The cavity 158 is partially defined by the concave internal surface 86. The rotor housing is sealedly fastened to the drive shaft housing by a plurality of longitudinally oriented bolts (not shown). A housing end cover 162 is connected to an end portion of the rotor housing by a plurality of bolts 166. The inside surface of the housing end cover 162 and the end portion of the rotor housing 42 facing thereto define a fuel spill chamber 170 which is always in fluid communication with the spill ports 155,156 of the fuel metering collar 146. The spill chamber 170 is fluidly connected in series to a pressure relief valve 174, mounted in the housing end cover, and the fuel supply tank 18.

As shown in FIGS. 1, 3, and 4 the rotor housing 42 defines eight generally radially outwardly extending distributor high pressure fuel outlet passages 178,182,186,190,194,198,202,206. The distributor outlet passages are arranged in first and second groups of four passages wherein each group lies in a separate or axially spaced plane. All of the distributor outlet passages lie above a horizontal plane containing the primary longitudinal axis 50. Furthermore, the adjacent distributor outlet passages of each group are angularly spaced 45° from one another with respect to the primary longitudinal axis 50. Each distributor outlet passage is adapted to be connected to a respective fuel injection line 210,214,218,222,226,230,234,238 wherein for ease of serviceability all eight such connections also lie above the horizontal plane containing the primary longitudinal axis 50. Although not shown, it is easily understood that each fuel injection line is connected downstream to a separate fuel injection nozzle associated with a respective engine combustion cylinder.

The rotor housing also defines a central longitudinal bore 242 which is coaxial with the primary longitudinal axis 50 and which perpendicularly intersects all of the distributor outlet passages 178,182,186,190,194,198,202,206 of the rotor housing. The bore 242 extends completely between and through the axial ends of the rotor housing.

An elongated sleeve 246 having cylindrical bore 248 is rigidly fixed within a major portion of the central longitudinal bore 242 preferably by a diametral interference fit. The rotor housing sleeve 246 includes a relatively wide circumferential low pressure fuel supply groove 250 which is always in fluid communication or always registers with the low pressure fuel supply passage 26, a pair of radial diametrically opposed low pressure fuel inlet ports 254,258 which are always in fluid communication with the circumferential fuel supply groove 250, and eight distributor high pressure fuel outlet ports 262,266,270,274,278,282,286,290 wherein each distributor outlet port is coaxially aligned and is always in fluid communication with a respective distributor outlet passage 178,182,186,190,194,198,202,206 of the rotor housing 42.

As shown in FIGS. 1 and 2, the rotor housing sleeve further includes a couple of radially outwardly extending fuel delivery ports 294,298. The delivery ports 294,298 lie in a common plane perpendicular to the primary longitudinal axis 50 and are angularly spaced from each other a preselected angle A2 equal to 135° with respect to the primary longitudinal axis. Although for ease of manufacture the sleeve 246 is preferably a component separate from the rotor housing, alternatively, the described geometric details of the sleeve may be integrally formed within the rotor housing.

The rotor housing 42 also defines two plunger bores 302,306 whose longitudinal axes are parallel to the primary longitudinal axis 50. The longitudinal axes of the plunger bores are radially offset a common preselected distance from the primary longitudinal axis 50 and are positioned in equi-angular relation (180° in this embodiment) to each other with respect to the primary longitudinal axis 50. A solid generally cylindrical pump plunger 310,314 having a forward conical end 318 is lap fitted and slidably received in each of the plunger bores. Each pump plunger is axially reciprocal in its respective plunger bore as indicated by the rightward top dead center, intermediate, and leftward bottom dead center positions of the forward conical end 318,318',318" shown in phantom in FIG. 1.

The forward conical end 318 of each pump plunger 310,314 and its respective plunger bore 302,306 define a respective fuel pumping chamber. Each pumping chamber is connected by way of a fuel delivery passage 322,324 defined in the rotor housing to the respective delivery port 294,298 of the rotor housing sleeve. A radial fuel leakage passage 326 defined within the rotor housing 42 intersects each plunger bore 302,306 below (i.e. to the left of according to FIG. 1) the bottom dead center position of the plunger end 318". The fuel leakage passage 326 radially inwardly fluidly connects the respective plunger bore with the circumferential relatively low pressure fuel supply groove 250 of the rotor housing sleeve 246.

Each of the plunger bores of the rotor housing has a concentric and enlarged counterbore 328 which slidably receives a cylindrical cup-shaped follower 330 having an appropriately conically-shaped end face 334. The included angle of each conically-shaped end face 334 is generally equal to 180° minus twice the angle between the primary longitudinal axis 50 and the crank axis 70. A helical compression spring 338 and a spring retainer 342 are also positioned in each counterbore around the rearward portion of each pump plunger to bias the conically-shaped end face 334 of each reciprocable follower 330 in continuous line contact against the planar actuating surface 90 of the nutator member 74.

In order to avoid the possibility of edge loading of the followers due to possible misalignment, it is preferable to make the conically-shaped end face 334 of each follower somewhat convex or crowned. In applications where the fuel injection pressures are relatively low, the followers 330 may be dispensed with so that the pump plungers 310,314 directly contact the planar actuating surface 90. Alternatively, in order to reduce side thrust on the pump plungers, the axes of the pump plungers may be oriented at a preselected incline angle relative to the primary longitudinal axis. The incline angle would be chosen so that when each pump plunger is traveling through its relatively short and working portion of its pumping stroke, the actuating force of the nutator member 74 is directed approximately along the axis of that pump plunger. In this alternative embodiment of the pump plungers, the conically-shaped end faces 334 of the followers would be replaced by, for example, spherical buttons.

Figure 6:
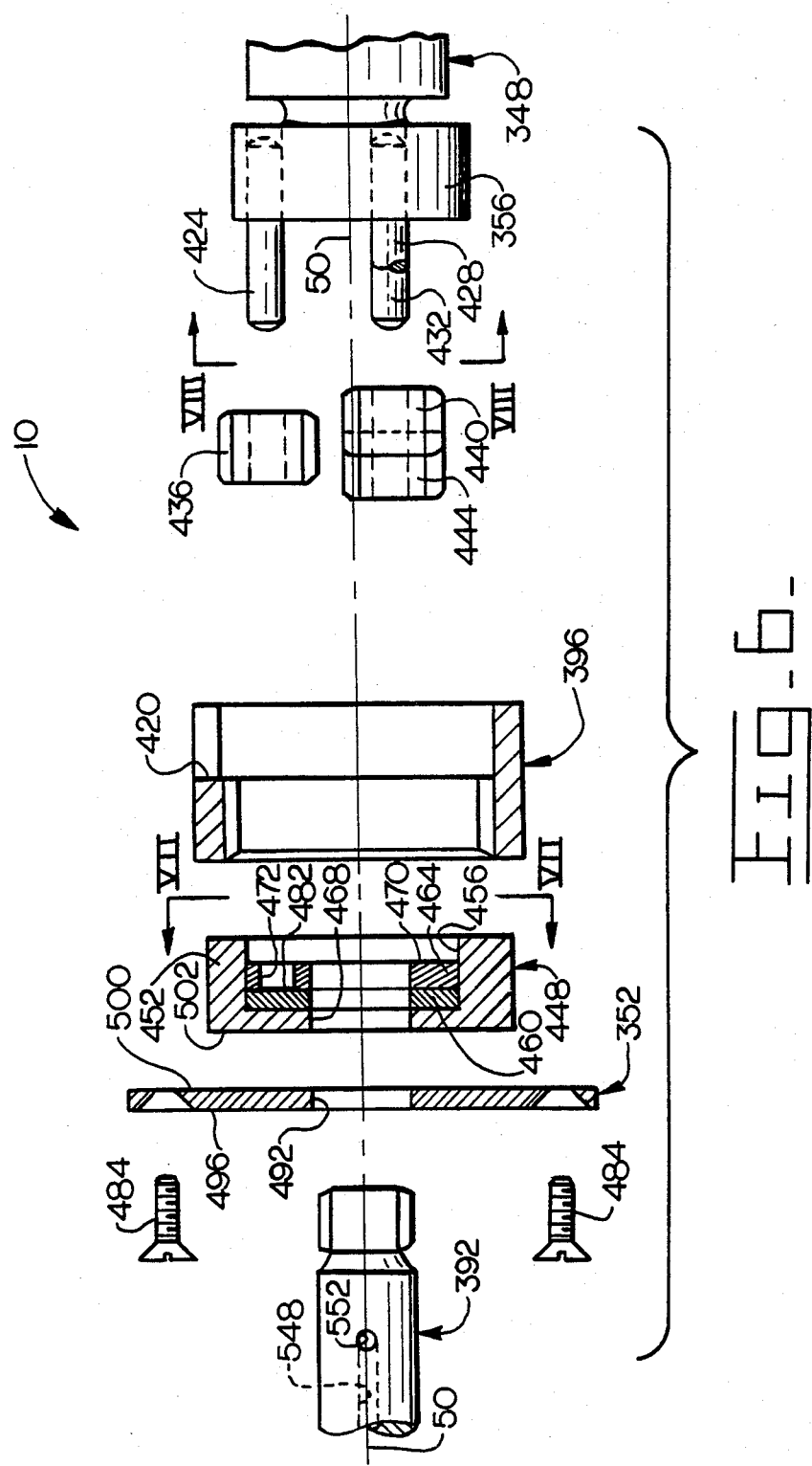
FIG. 6 is a diagrammatic enlarged exploded partial view of the embodiment of the present invention with some of the components shown in cross-section.

As shown in FIGS. 1 and 6, the thrust and planetary gear coupling 10 includes a rotatable distributor rotor 348, a planetary gear reduction mechanism or angular speed reduction means 392,396,424,428,432,436,440,444,448 for rotatively driving the distributor rotor with the drive shaft to rotate the distributor rotor at a preselected output angular speed which is proportional to and less than the preselected input angular speed of the drive shaft, and a stationary dual-thrust plate 352.

A substantial portion of the distributor rotor is slidably received and rotatively positioned according to a lap fit within the cylindrical bore 248 of the rotor housing sleeve 246 except for one enlarged end portion or flange 356 which is permitted to slidably abut an annular end 360 of the rotor housing sleeve. The flange 356 in cooperative contact with the annular end 360 of the stationary rotor housing sleeve thus controls one direction of axial end play (i.e. rightward linear movement according to FIG. 1) of the distributor rotor 348. The other end portion of the distributor rotor slidably extends through and supports the rotatable fuel metering collar 146 which is held on by a snap ring 362. The fuel metering collar is lap fitted to the distributor rotor.

As shown in FIGS. 1 and 2, the distributor rotor 348 further includes four peripheral axially extending low pressure fuel supply slots 364a,364b,364c,364d which always register with the radial relatively low pressure inlet ports 254,258 of the rotor housing sleeve by way of a circumferential low pressure fuel feed groove 368 formed on about the middle periphery of the distributor rotor. Each of the wedge-shaped slots 364a–d is partly defined by a respective straight-edged scroll or blocking surface 372a,372b,372c,372d.

The distributor rotor also includes four angled high pressure fuel inlet passages 374a,374b,374c,374d which are each either opened or closed to the fuel delivery ports 294,298 by one of the scrolls 372a,372b,372i c,372d. The angled passages 374a–d all converge and join into a central longitudinal high pressure fuel passage 376. The passage 376 branches off into two axially spaced and radially outwardly extending distributor high pressure fuel outlet passages 380,384 which radially outwardly extend in opposite directions. As shown in FIGS. 1 and 4, one 384 of the fuel outlet passages of the distributor rotor lies in the same plane containing the first group of four fuel outlet passages 178,182,186,190 of the rotor housing. As shown in FIGS. 1 and 3, the outer 380 of the fuel outlet passages of the distributor rotor lies in the same plane containing the second group of four fuel outlet passages 194,198,202,206 of the rotor housing. The passage 376 also branches off longitudinally farther downstream into four radially outwardly extending fuel spill passages 388a,388b,388c,388d. As shown in FIG. 5, the radial spill passages 388a–d of the distributor rotor all lie in the same transverse plane as the spill ports 155,156 of the fuel metering collar 146 and are equi-angularly spaced a preselected angle of 90° from one another with respect to the primary longitudinal axis 50.

As shown in FIGS. 1 and 2, the axial passage 376 joins with a stepped counterbore 390 formed on the other axial end portion of the distributor rotor 348. A fuel spill restrictor 391 having a reduced diameter rod like end portion or finger is screw threadably positioned in the counterbore 390. The rod end portion of the fuel spill restrictor in cooperation with the surrounding passage 376 or stepped counterbore 390 defines an annular fixed sized orifice immediately upstream of the radial spill passages 388a–d. The effective size of the orifice is adjustable-depending on the chosen size or diameter of the rod end portion and, in this embodiment, to a much lesser extent on how deep the spill restrictor is screwed into the counterbore.

As shown in FIG. 6, the planetary gear reduction mechanism 392,396,424,428,432,436,440,444,448 includes a rotatable sun-gear shaft 392, an internally-toothed ring gear 396, and a rotatable planet gear and carrier assembly 424,428,432,436,440,444,448.

As shown in FIG. 1, the sun-gear shaft 392 is coaxially and directly driven by the drive shaft 38 so that they both rotate together at the same preselected input angular speed. One axial end of the sun-gear shaft defines a rectangular drive slot 400 which is slidably engaged by an axially-aligned complementary tang 404 of a cylindrical plug 408. The plug 408 is pressed or otherwise fixed within a central and stepped longitudinal bore 412 of the drive shaft 38. The slip-on fit of the sun-gear shaft 392 around the tang 400 has a preselected tolerance to help accommodate possible misalignment as the sun-gear shaft extends between the drive shaft 38 and the planet gear and carrier assembly.

The ring gear 396 is slidably received in the central longitudinal bore 242 of the rotor housing 42 and slidably abuts the annular end 360 of the rotor housing sleeve 246. The ring gear is thus positioned in concentrically spaced relation to the sun-gear shaft 392. As shown in FIGS. 1, 6, and 9 an eccentric arm 416 connected to the rotatable timing advance crank 142 engages a rectangular slot 420 defined through the top of the ring gear. The timing advance crank holds the ring gear in a normally stationary angular position relative to the rotor housing unless the governor 110 rotates the timing advance lever to thereby rotate the ring gear to a new normally stationary angular position in preselected response to a sensed change in engine crankshaft speed.

The planet gear and carrier assembly 424,428,432,436,440,444,448 meshes radially between the sun-gear shaft 392 and the ring gear 396 and is adapted during operation to directly rotate the distributor rotor at a same preselected output angular speed. The planet gear and carrier assembly includes a plurality of eccentric carrier pins 424,428,432, a plurality of planet gears 436,440,444 equal to the number of such eccentric carrier pins, and a carrier end cover 448.

The eccentric carrier pins are rigidly connected and extend longitudinally outwardly from the enlarged flange 356 of the distributor rotor 348. Preferably, as shown in FIG. 6, the eccentric carrier pins are each press fitted into a respective longitudinally extending bore of the distributor rotor flange 356. There are three such eccentric carrier pins which are radially offset a common preselected distance from the primary longitudinal axis 50. Furthermore, the eccentric carrier pins are positioned in equi-angular relation (120° in this embodiment) to each other with respect to the primary longitudinal axis. The planet gears 436,440,444 are slidably assembled onto a respective eccentric carrier pin 424,428,432 for free rotation thereon and radially mesh between the sun-gear shaft 392 and the ring gear 396.

The gear tooth ratio between the normally stationary ring gear 396 and the sun-gear shaft 392 is 3:1 so that during engine operation the sun-gear shaft 392 rotates at the input angular speed of twice engine crankshaft speed while both the planet gear and carrier assembly and the distributor rotor rotate together at the same output angular speed of one-half engine crankshaft speed.

The carrier end cover 448 releasably retains all the planet gears on the eccentric carrier pins and includes an outer cylindrical cup-shaped body 452, defining an axial counterbore 456, and a pair of first and second washers 460,464 which are positioned in the counterbore 456 and are rigidly secured to the cylindrical body 452. The cylindrical body 452 is preferably made of an aluminum alloy and together with the washers 460,464 defines a central axial bore 468. The bore 468 has a diameter which is slightly larger than the outside diameter of the sun-gear shaft 392 in order to allow the sun-gear shaft to freely pass therethrough during assembly.

The first washer 460 is imperforate except for its central bore 468 and is made of a high-wear resistant material such as steel. The second washer 464 includes an annular surface 470, which directly faces the planet gears, and a plurality of longitudinally oriented pin bores 472,476,480 which become blind bores after assembly due to one adjacent annular surface 482 of the imperforate first washer 460. Each of the blind bores slidably receives a respective eccentric carrier pin 424,428,432, which can abut the first washer surface 482, so that both the distributor rotor 348 and the carrier end cover 448 can directly rotate together at the same output angular speed.

The dual-thrust plate 352 is adapted to be releasably fastened by a plurality of screws 484 to an end portion 488 of the rotor housing 42 which faces and internally engages the cavity 158 of the drive shaft housing 34. The dual-thrust plate includes a central axial bore 492 through which the sun-gear shaft 392 freely passes during assembly to centrally mesh with the planet gear and carrier assembly The dual-thrust plate has a pair of oppositely facing planar thrust-bearing surfaces 496,500 which respectively control other directions of axial end play or linear movement of the drive shaft and distributor rotor. One 496 of the thrust-bearing surfaces directly faces and can act as a bumper or stop for the proximate end portion of the drive shaft 38, more specifically, the outward end of the oblique journal 66. The other 500 of the thrust-bearing surfaces directly faces and can act as a bumper or stop for the proximate axial end or end portion 502 of the cylindrical body 452 of the carrier end cover 448. Moreover, the other 500 of the thrust-bearing surfaces retains the carrier end cover 448 onto the eccentric carrier pins that are connected to the distributor rotor flange 356.

As previously mentioned, the basic design of the distributor fuel injection pump 14 can be altered for use on various other even firing and some uneven firing engine configurations. For use in all four-cycle engine configurations, the distributor rotor is rotated at one-half engine crankshaft speed. However, other features of the distributor fuel injection pump 14 would vary according to the total number of four-cycle engine combustion cylinders as shown in the following table:

| C | SR | P | DS | A2 | S | SC | A1 | SR | A3 |
|---|----|----|----|------|----|----|------|----|------|
| 2 | 2 | 1 | 1 | — | 2 | 2 | 180° | 1 | — |
| 3 | 1.5 | 1 | 1 | — | 3 | 3 | 120° | 1 | — |
| 4 | 2 | 1 | 1 | — | 4 | 4 | 90° | 1 | — |
| 5 | 2.5 | 1 | 1 | — | 5 | 5 | 72° | 1 | — |
| 6 | 2 | 3 | 3 | 120° | 2 | 3 | 120° | 2 | 180° |
| 6 | 1.5 | 2 | 2 | 180° | 3 | 2 | 180° | 3 | 120° |
| 8 | 2 | 2 | 2 | 135° | 4 | 2 | 135° | 4 | 90° |
| 12 | 2 | 3 | 3 | 120° | 4 | 3 | 120° | 4 | 90° |

Wherein
C = number of engine combustion cylinders.
SR = speed ratio of pump drive shaft speed to engine crankshaft speed.
P = number of pump plungers.
DS = number of fuel delivery ports of the rotor housing sleeve.
A2 = angular spacing (FIG. 2) between the adjacent fuel delivery ports relative to the primary longitudinal axis 50.
S = number of scrolls 372 of the distributor rotor 348.
SC = number of fuel spill ports of the fuel metering collar 146.
A1 = angular spacing (FIG. 5) between the adjacent fuel spill ports of the fuel metering collar 146 relative to the primary longitudinal axis 50.
SR = number of radial fuel spill passages 388 of the distributor rotor 348.
A3 = angular spacing between the adjacent radial fuel spill passages 388 of the distributor rotor 348 relative to the primary longitudinal axis 50.

A number of general relationships exist in the basic design of this distributor fuel injection pump which are common to some or all of the engine configurations listed in the above table. For example, the total number of pump plungers P is always less than the total number of engine combustion cylinders C. Also, the total number of pump plungers P times the total number of scrolls S is always equal to the total number of engine combustion cylinders C. Also, on the pumps having more than one pump plunger, the total number of fuel delivery ports DS and their angular spacing A2 are of the same magnitude as the total number of fuel spill ports SC and their angular spacing A1 within the fuel metering collar. Moreover, on the pumps having more than one pump plunger, the total number of fuel delivery ports DS times the total number of radial fuel spill passages SR of the distributor rotor equals the total number of engine combustion cylinders C. Furthermore, the total number of fuel spill ports SC of the fuel metering collar times the total number of radial fuel spill passages SR of the distributor rotor is always equal to the total number of engine combustion cylinders C. For use on all two-cycle engine configurations, the distributor rotor is rotated at engine crankshaft speed and other relationships can be similarly derived.

FIGS. 1 and 6 also disclose an internal lube passage means 504,508,512,516,520,524,528,532,412, 36,540,544,548,552,556 for supplying pressurized engine lubrication oil to the semi-spherical bearing interface 82,86 between the nutator member 74 and the drive shaft housing 34, the concentric journal of the drive shaft 38 supported in the cylindrical bore 46 of the drive shaft housing 34, the sleeve bearing 78 of the nutator member, the thrust bearing interface between the dual-thrust plate 352 and the carrier end cover 448, the rotatable flyweight carrier 118, and the axially slidable governor riser shaft 134.

A lube conduit 504 is adapted to connect an internal axial lube passage 508 of the drive shaft housing 34 with an external source of pressurized engine lubrication oil. The axial lube passage 508 is connected in series to a smaller diameter or orificed radial lube passage 512 of the drive shaft housing 34 and an annular groove 516 formed in the concave internal bearing surface 86. The annular groove 516 is also connected to a radial lube passage 520 of the drive shaft housing which is connected to other lube passages leading to the bearing surfaces of the flyweight carrier 118 and of the governor riser shaft 134.

The axial lube passage 508 of the drive shaft housing 34 is also connected to a diagonal lube passage 524 which leads to an annular circumferential groove 528 formed in the cylindrical bore 46 that supports the drive shaft 38.

The annular groove 528 is connected to a diagonal lube passage 532 of the drive shaft 38 which leads to the longitudinal bore 412 of the drive shaft. The longitudinal bore 412 is connected to a radially outwardly extending lube passage 536 and an annular circumferential groove 540 defined around the oblique journal 66 and facing the sleeve bearing 78.

The longitudinal passage 412 of the drive shaft 38 is also connected in series to a pair of axial lube passages 544,548 defined in the plug 408 and in the sun-gear shaft 392, respectively. The axial passage 548 of the sun-gear shaft is connected to a radially outwardly extending lube passage 552 of the sun-gear shaft which has a peripheral opening that is generally aimed towards the thrust-bearing interface between the dual-thrust plate 352 and the carrier end cover 448.

The engine lubricating oil circulated within the distributor fuel injection pump 14 is isolated from the fuel flowing in the pump 14 and is permitted to flow out through one or more lube drain openings 556 of the driven end of the drive shaft housing 34. The lube drain openings 556 are adapted to be connected, for example, by a timing gear train cover (not shown) of the engine to an engine oil sump 560.

INDUSTRIAL APPLICABILITY

While the assembly and operation of the present invention is believed to be clearly apparent from the foregoing description and drawings, further amplification will be made in the following brief summary of such operation.

During operation, a camshaft gear or other timing gear (not shown) of a four-cycle eight cylinder internal combustion engine rotatively drives the gear 54 and the drive shaft 38 of the distributor fuel injection pump 14 at twice engine crankshaft speed. The rotating oblique journal 66 of the drive shaft causes the nutator member 74, freely journaled thereon, to nutate but not positively rotate with the oblique journal. Technically, the motion of the spin axis 70 of the nutator member is not pure nutation but rather precession about the precession axis 50 at a constant angular velocity relative to the drive shaft 38.

While the nutator member is not deliberately prevented from rotating, rotation is largely prevented by friction between the contacting planar actuating surface 90 of the nutator member and the conically-shaped end faces 334 of each spring-biased follower 330. However, wear between those contacting surfaces is evenly spread since a certain amount of slow rotation of the nutator member about the crank axis 70 of the oblique journal does take place as does some rotational movement of the followers about their own longitudinal axes.

The fuel quantity and pressure capacity of the distributor fuel injection pump is augmented due to the planar actuating surface 90 and conically-shaped end faces 334 of the followers having relatively large radii of curvature without the nutator member and followers being overly large. The hertz contact stresses are thus relatively low as the planar actuating surface 90 essentially rolls across the conically-shaped end faces 334 of the followers 330.

The planar actuating surface 90 of the nutator member imparts a high speed harmonic motion to all of the reciprocating followers 330 and their associated pump plungers 310,314. The two pump plungers always simultaneously move at the same magnitude of sinusoidal velocity but move in opposite directions since they and their followers are positioned on diametrically opposite sides of the planar actuating surface 90. With the drive shaft rotating at twice engine crankshaft speed, each pump plunger is linearly displaced in essentially sinusoidal motion through four evenly sequenced pumping strokes during 720° of engine crankshaft rotation which is the interval required for a complete combustion cycle in a 4-cycle engine. Thus, the two pump plungers 310,314 can each alternately generate, in the proper sequence, a highly pressurized fuel charge to one of two respective sets of four engine combustion cylinders of the 8-cylinder engine.

The pumping reaction loads are transmitted almost entirely by the relatively large semi-spherical convex surface 82 of the nutator member 74 to the rigidly supported complementary concave surface 86 of the drive shaft housing 34. A minimal portion of the pumping reaction loads is transmitted to the semi-spherical concave surface 86 by the semi-spherical projection 98, of the drive shaft 38, whose main function is to control the leftward axial end play of the drive shaft 38 according to FIG. 1.

As shown in FIG. 1, a hydrodynamic oil film is provided at the interface between those complementary surfaces 82,86 via an external source of pressurized engine lubrication oil which is conducted through the internal lube passages 504,512,516 of the drive shaft housing 34. Since the nutator member does not positively turn with the drive shaft 38, the relatively low sliding velocity of the convex surface 82 produces minimal shearing forces in the hydrodynamic oil film. The relatively large bearing surface 86 and the very stable hydrodynamic oil film thereon augment the relatively high fuel pressure capability and relatively high fuel delivering capacity of this relatively compact distributor fuel injection pump 14.

Pressurized engine oil is also conducted to the sleeve bearing 78 of the nutator member via the internal lube passages 504,508,524,528 of the drive shaft housing 34 and the internal lube passages 532,412,536,540 of the drive shaft 38. The engine oil flows out of the pump 14 via one or more of the lube drain openings 556 which are adapted to be connected to the engine oil sump 560.

The sun-gear shaft 392, rotating together with the drive shaft 38 at the preselected input angular speed of twice engine crankshaft speed, drives the planet gears 436,440,444 rotationally around the normally stationary ring gear 396. The 4:1 planetary gear reduction ratio causes the eccentric carrier pins 424,428,432 and the distributor rotor 348 fixed thereto to rotate at the preselected output angular speed of one-half engine crankshaft speed in the same rotational direction as that of the drive shaft. The fuel transfer pump 22 driven by the cam 122 at engine crankshaft speed positively pumps fuel at a relatively low pressure of, for example, about 172 to 414 kilopascals (25 to 60 pounds per square inch) from the fuel supply tank 18 to the passage 26 of the rotor housing, circumferential groove 250 and radial ports 254,258 of the rotor housing sleeve 246, and then to the peripheral axial fuel supply slots 364a–d of the distributor rotor 348. FIGS. 2–5 illustrate the distributor rotor rotating, for example, in the direction of the circular arrows shown. At the moment shown, the general positions of the pump plungers 310,314, the distributor rotor 348, and the fuel metering collar 146 are such that:

(i) the pump plunger 310 is advancing rightward in FIG. 1 near the top dead center position of its pumping stroke.

(ii) the pump plunger 314 is receding leftward according to FIG. 1 near the bottom dead center position of its filling stroke.

(iii) the relatively low pressure fuel supply slot 364b of the distributor rotor shown in FIG. 2 is completely registered with the fuel delivery port 298 of the rotor housing sleeve 246 such that the pumping chamber of the pump plunger 314 is filling with fuel.

(iv) the scroll 372a of the distributor rotor shown in FIG. 2 has previously closed fluid communication between the relatively low pressure fuel supply slot 364a and the fuel delivery port 294.

(v) the angled fuel inlet passage 374a of the distributor rotor shown in FIG. 2 is completely registered with the fuel delivery port 294.

(vi) all of the radial fuel spill passages 388a–d of the distributor rotor shown in FIG. 5 are closed off from the fuel spill ports 155,156 of the fuel metering collar 146.

(vii) the distributor fuel outlet passage 380 of the distributor rotor shown in FIG. 4 is completely registered with the distributor fuel outlet passage 282 of the rotor housing sleeve 246.

Thus, fuel in the diminishing pumping chamber of the pump plunger 310 is being pumped at a very high pressure of, for example, about 103,425 kilopascals (15,000 pounds per square inch) and is being injected out through the passages 322,294,374a,376,380,282,198 and then through the fuel injection line 230 to a fuel injection nozzle of a respective engine combustion cylinder. The relatively high injection pressure capability of the distributor fuel injection pump 14 facilitates finer atomization and deeper penetration of the fuel as it is injected into an engine combustion chamber. Finer atomization and deeper penetration of the fuel results in more complete combustion for better fuel economy and lower noxious emissions.

As shown in FIG. 5, in the next few degrees of rotation of the distributor rotor, fuel injection will terminate once the radial fuel spill passage 338a of the distributor rotor registers with the fuel spill port 155 of the normally stationary fuel metering collar 146. The fuel spilled through the fuel metering collar enters the spill chamber 170 and is relieved through the valve 174 to flow back to the fuel supply tank 18. Once fuel injection has ended, the pumping chamber of the pump plunger 310 continues to spill excess fuel through the spill passage 388a and the spill port 155 until the pump plunger 310 reaches its top dead center position indicated by the numeral 318 in FIG. 1.

At this point, the pump plungers 310,314 simultaneously reverse their opposite directions of travel. Moreover, the angular position of the distributor rotor is such that a second fuel injection similar to the first one described above will begin to occur from the pumping chamber of the pump plunger 314 once the scroll 372b blocks fluid communication between the relatively low pressure fuel supply slot 364b and the fuel delivery port 298. This second fuel injection is ended when the radial fuel spill passage 388c of the distributor rotor shown in FIG. 5 registers with the fuel spill port 156 of the fuel metering collar 146.

Beginning with the angular position of the distributor rotor 348 shown in FIGS. 1–5, it can be seen that in two subsequent 45° increments of distributor rotor angular movement (i.e. two subsequent 90° increments of engine crankshaft angular movement) the distributor fuel outlet passage 380 of the distributor rotor will sequentially communicate highly pressurized fuel to the passages leading to the respective fuel injection lines 234,238. In four more subsequent 45° increments of distributor rotor angular movement, the other distributor fuel outlet passage 384 of the distributor rotor will sequentially communicate highly pressurized fuel to the passages leading to the respective fuel injection lines 210,214,218,222. In one more subsequent 45° increment of distributor rotor angular movement, the distributor fuel outlet passage 380 will communicate highly pressurized fuel to the passages 278,194 leading to the fuel injection line 226.

the firing order of an even firing eight cylinder engine can, for example, be 1-2-7-3-4-5-6-8. In such a case, the fuel injection lines 230,234,238,210,214,218,222,226 are connected to the respective engine combustion cylinders numbered 1, 2, 7, 3, 4, 5, 6, and 8. Thus, the pumping chamber of the pump plunger 310 sequentially supplies highly pressurized fuel to the engine combustion cylinders numbered 1, 7, 4, and 6 while the pumping chamber of the pump plunger 314 sequentially supplies highly pressurized fuel to the engine combustion cylinders numbered 2, 3, 5, and 8.

FIGS. 1 and 5 show that fuel metering or the quantity of fuel injected is controlled through angular movement of the fuel metering collar 146 by fuel injection metering control means inclduing the governor 110, the system of mechanical linkages 138, and the metering crank 150. If the fuel metering collar 146 is angularly moved clockwise according to FIG. 5, the distributor rotor 348 must rotate further before the radial spill passage 338a registers with the radial spill port 155. Thus, clockwise angular movement of fuel metering collar 146 according to FIG. 5, increases the angular duration of fuel injection and therefore increases the quantity of fuel injected. Likewise, counterclockwise angular movement of the fuel metering collar 146 decreases the quantity of fuel injected.

In order to prevent cavitation in the passages of the distributor rotor, the rate of high pressure fuel spill through the fuel metering collar 146 is controlled by the effective size of the annular orifice defined by the rod like end portion of the spill restrictor 391. As the high pressure fuel spills through the collar 146, the pressure in the passage 376 eventually decreases to a level where the rate of fuel spill is also advantageously controlled for further hydraulic stability by the preselected setting of the pressure-relief valve 174. The valve 174 maintains a preselected back pressure of, for example, about 400 to 1500 kilopascals (58 to 218 pounds per square inch) in the spill chamber 170 of the distributor fuel injection pump 14. As the pressure in the passage 376 decreases during fuel spill, the back pressure advantageously eliminates any voids left in the high pressure fuel passages of the distributor rotor and also minimizes the size of any entrained air bubbles.

The back pressure in the spill chamber acts on an adjacent axial end of the rotating distributor rotor 348 and thrusts it leftwardly according to FIG. 1. The thrust force is transmitted through the eccentric carrier pins 424,428,432 to the carrier end cover 348 which slidably bears against the thrust-bearing surface 500 of the stationary dual-thrust plate 352. The dual-thrust plate then transmits the thrust force to the rotor housing 42. Pressurized engine oil is conducted from the internal lube passage 412 of the drive shaft 38 to the internal lube passages 544,548,552 where the oil radially exits the sun-gear shaft 392 and is sprayed generally towards the thrust-bearing surface 500 of the dual-thrust plate 352.

The dual-thrust plate 352 is unique in that this single component is quite compact and inexpensive and provides two thrust-bearing surfaces 496,500 which respectively control one direction of axial end play of the distributor rotor and an opposite direction of axial end play of the drive shaft 38. Such an arrangement is particularly advantageous where the drive shaft 38 and the distributor rotor 348 rotate at different angular speeds.

Timing of the beginning of the fuel injection interval is adjustable in preselected response to a sensed change in engine crankshaft speed. Timing is advanced or retarded by simply advancing or retarding the angular phase of the distributor rotor 348 relative to the driveshaft 38 which moves in fixed relation to the pump plungers 310,314, the engine crankshaft, and the combustion cylinder pistons. FIGS. 1 and 9 show that the timing of fuel injection is controlled by fuel injection timing control means including the governor 110, the system of mechanical linkages 138, and the rotatable timing advance crank 142 which can rotate the normally stationary ring gear 396 to a new angular position relative to the rotor housing 42.

The angled fuel inlet passages 374a–d, distributor fuel outlet passages 380,384, and fuel spill passages 388a–d of the distributor rotor are symetrically arranged so as to circumferentially balance out each of the pressure fields which lies in the minute rotor-to-bore clearance and which surrounds a respective opening of one of those high pressure fuel passages. Since both the inertia and the drag forces on the distributor rotor are very small, very little torque is required to rotate the ring gear 396 relative to the sun-gear shaft 392 and the planet gear and carrier assembly 424,428,432,436,440,444,448. Likewise, very little torque is required to rotate the fuel metering collar 146 relative to the distributor rotor because the fuel metering collar has low inertia and the hydrostatic forces acting thereon are substantially balanced. Thus, no hydraulic servos, relatively large governor flyweights, or relatively large mechanical linkages are required for advancing or retarding the timing of fuel injection or for adjusting the quantity of fuel injection of this relatively compact distributor fuel injection pump 14.

Moreover, while a mechanical governor 110 has been illustrated in this embodiment for controlling the angular positions of the ring gear 396 and the fuel metering collar 146, other control means such as a programmable electronic governor and electrical servo system may be employed. Such a programmable electronic governor may control the timing and quantity of fuel injection in preselected response to sensed changes in engine crankshaft speed and/or other engine operating conditions or parameters.

Other aspects, objects, and advantages of this invention can be obtained from a study of the drawings, the disclosure, and the appended claims.

We claim:

1. A thrust and planetary gear coupling for a distributor fuel injection pump having a pumpinq element and a housing which supports a rotatable drive shaft to drive the pumpinq element comprising:
    a distributor rotor adapted during operation to sequentially communicate pressurized fuel from the pumping element to more than one combustion cylinder of an engine, said distributor rotor adapted during operation to be axially fixed and rotatively disposed in the housing;
    a planetary gear reduction mechanism adapted for drivingly interconnecting said distributor rotor with the drive shaft to rotate said distributor rotor at a preselected output angular speed which is proportional to and less than a preselected input angular speed of the drive shaft, said planetary gear reduction mechanism including a rotatable sun-gear shaft adapted to be driven by the drive shaft at the same input angular speed, a normally stationary internally-toothed ring gear positioned in concentrically spaced relation around the sun-gear shaft, and a rotatable planet gear and carrier assembly which meshes radially between the sun-gear shaft and the ring gear and which is adapted during operation to rotate the distributor rotor at the same output angular speed; and
    a dual-thrust plate adapted to be releasably fastened to the housing and having a bore through which the sun-gear shaft extends to mesh with the planet gear and carrier assembly, said dual-thrust plate having a pair of oppositely facing thrust-bearing surfaces wherein one of the thrust-bearing surfaces is adapted to directly face and control one direction of axial end play of the drive shaft and wherein the other of said thrust-bearing surfaces retains and during operation is adapted to be beared against by a proximate end portion of said planet gear and carrier gear assembly and controls one direction of axial end play of the distributor rotor.

2. A distributor fuel injection pump for a multi-cylinder internal combustion engine comprising:
    a drive shaft housing;
    a drive shaft journalled for rotation about a primary longitudinal axis in said drive shaft housing;
    a pumping element adapted to be driven by said drive shaft;
    a rotor housing connected to the drive shaft housing and having an end portion positioned within the drive shaft housing, said rotor housing defining a bore coaxially aligned with said primary longitudinal axis and opening outwardly through said end portion of the rotor housing;
    a distributor rotor adapted to sequentially communicate pressurized fuel from the pumping element to more than one combustion cylinder of the engine, said distributor rotor being rotatably disposed in said rotor housing bore and being longitudinally spaced from said drive shaft;
    a planetary gear reduction means for drivingly interconnecting said drive shaft with the distributor rotor to rotate said distributor rotor at a preselected output angular speed which is constantly proportional to and less than a preselected input angular speed of said drive shaft, said planetary gear reduction means including a rotatable sun-gear shaft driven by the drive shaft at the same input angular speed, an internally-toothed ring gear positioned in concentrically spaced relation with respect to said sun-gear shaft and being normally stationary relative to said rotor housing and a rotatable planet gear and carrier assembly which meshes radially between said sun-gear shaft and said ring gear and which drives the distributor rotor at the same output angular speed; and
    a dual-thrust plate releasably fastened to said end portion of the rotor housing and having a bore through which said sun-gear shaft extends to mesh with said planet gear and carrier assembly, said dual-thrust plate having a pair of oppositely facing thrust-bearing surfaces wherein one of the thrust-bearing surfaces directly faces and controls one direction of axial end play of the drive shaft and wherein the other of said thrust-bearing surfaces retains and during operation is adapted to be beared against by a proximate end portion of said planet gear and carrier assembly and controls one direction of axial end play of the distributor rotor.

3. The distributor fuel injection pump, as set forth in claim 2, wherein said sun-gear shaft includes a lube passage means for supplying pressurized lubricating fluid to the interface between the other of said dual-thrust plate thrust-bearing surfaces and the planet gear and carrier assembly, said lube passage means being located in the sun-gear shaft and having a longitudinal passage, which is adapted to communicate with a source of pressurized lubricating fluid, and an interconnected radially outwardly extending passage which peripherally opens generally towards said interface.

4. The distributor fuel injection pump, as set forth in claim 2, wherein said planet gear and carrier assembly includes a plurality of eccentric carrier pins connected to and extending longitudinally outwardly from one end portion of the distributor rotor, each of said eccentric carrier pins being radially offset a common preselected distance from the primary longitudinal axis, a plurality of planet gears equal to the number of said eccentric carrier pins and rotatably mounted on a respective one of the eccentric carrier pins and radially meshing between the sun-gear shaft and the ring gear.

5. The distributor fuel injection pump, as set forth in claim 4, wherein said one end portion of the distributor rotor is an enlarged flange adapted to control an opposite direction of axial end play of the distributor rotor.

6. The distributor fuel injection pump, as set forth in claim 4, wherein said planet gear and carrier assembly further includes a releasable carrier end cover rotatably disposed in said rotor housing bore and having a pair of oppositely facing axial end surfaces, wherein during operation one of said cover axial end surfaces bears against said other of the dual-thrust plate thrust-bearing surfaces, the other of said cover axial end surfaces facing and retaining all of said planet gears on the eccentric carrier pins, said carrier end cover defining a plurality of longitudinally oriented blind bores which each slidably receive a respective one of the eccentric carrier pins.

* * * * *